G. E. STANLEY.
CHANGE SPEED GEAR.
APPLICATION FILED DEC. 10, 1919.
1,355,864.
Patented Oct. 19, 1920.
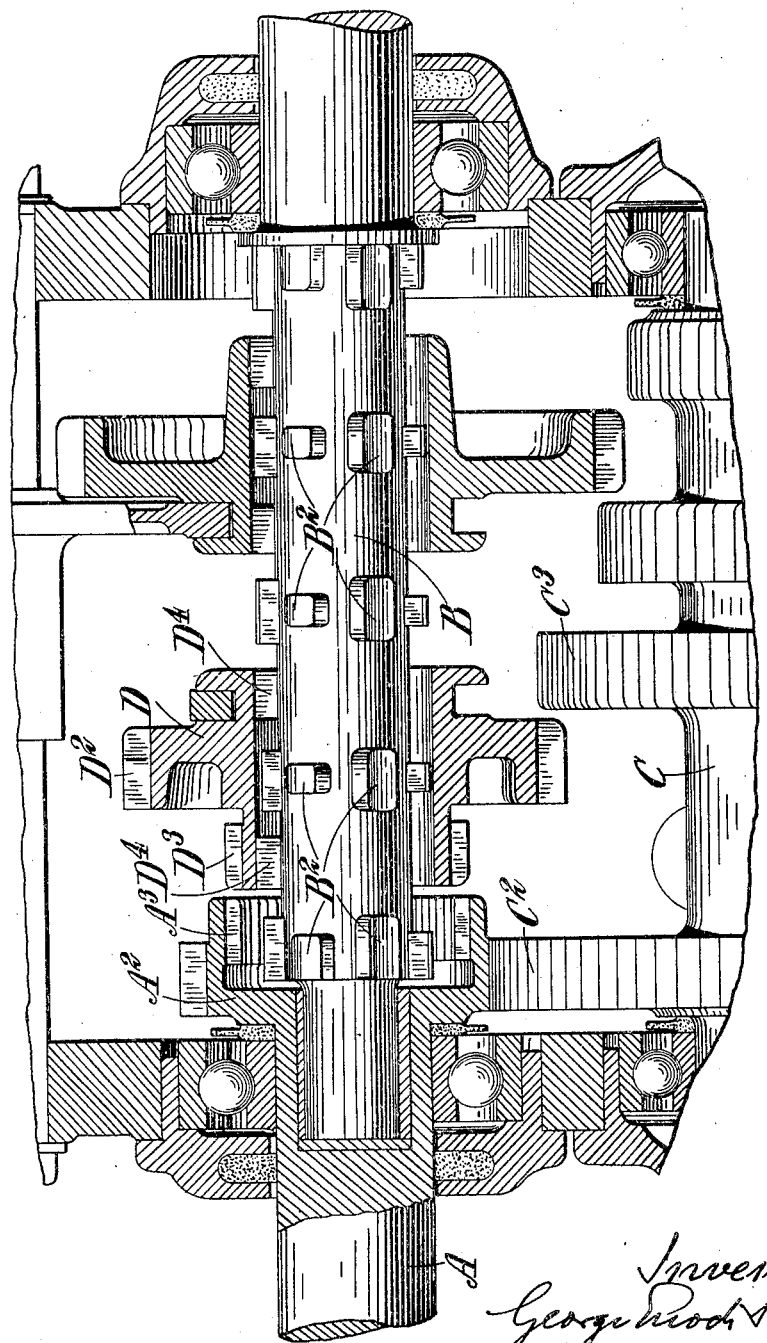

UNITED STATES PATENT OFFICE.

GEORGE ENOCH STANLEY, OF COVENTRY, ENGLAND, ASSIGNOR TO STANLEY GEARS LIMITED, OF COVENTRY, ENGLAND.

CHANGE-SPEED GEAR.

1,355,864.     Specification of Letters Patent.     Patented Oct. 19, 1920.

Application filed December 10, 1919. Serial No. 343,731.

*To all whom it may concern:*

Be it known that I, GEORGE ENOCH STANLEY, a subject of the King of England, residing at Coventry, in the county of Warwick, England, have invented certain new and useful Improvements in Change-Speed Gears, of which the following is a specification.

This invention relates to change-speed gears in which co-axially mounted driving and driven shafts are engaged with one another by a member slidable upon one of them, which member is adapted to connect them operatively, either directly, or by the aid of a gear formed with it to engage coöperating gears carried upon a parallelly-disposed lay shaft in permanent engagement with the driving shaft, and it especially refers to that type of change speed gear in which the sliding member, in its neutral position, is rotatably free on its supporting shaft, and is provided with one or more sets of dogs adapted to engage splines upon the said shaft, and with a further set arranged to engage the coöperating coaxially mounted driving or driven member.

According to this invention, the dogs are so arranged that the sliding member is clutched to the coöperating member in advance of its engagement with its own shaft. By this arrangement, where, as is usual, the dogs engaging the coöperating member are situated at a greater radius from their rotational axis than those which engage the shaft, the first engagement takes place with those dogs having the greater peripheral speed, whereby the shock of the final engagement is minimized.

In the accompanying drawing, which represents a longitudinal section of a part of a change-speed gear embodying this invention, the shaft A is the driving shaft and the driven shaft B is mounted co-axially with it in the known manner. A gear wheel $A^2$ on the driving shaft A is in constant mesh with a gear wheel $C^2$ on the lay shaft C, and a sliding member D mounted upon the shaft B is adapted either to engage by means of a gear wheel $D^2$ carried upon it with a gear $C^3$ on the lay shaft C, or to be clutched to the gear-wheel $A^2$ to form a direct driving connection of the shafts A and B.

The sliding member D is provided with a set of dogs in the form of a spur-wheel $D^3$ concentrically mounted upon it, whose teeth are adapted to engage corresponding internally disposed teeth $A^3$ on the gear wheel $A^2$. Dogs $D^4$ at each end of the member D are adapted to engage interrupted splines $B^2$ on the shaft B, which form sets of dogs having alternately long and short members, in the known manner.

When the sliding member D is in the neutral position, as shown in the drawing, it is free from engagement with the shaft B. The arrangement of the dogs $D^3$, $D^4$ and the teeth $A^3$ and splines $B^2$ coöperating with them, which constitutes the principal feature of this invention, is such that on moving the sliding member D to the direct drive, the teeth of the spur-wheel $D^3$ engage with the teeth $A^3$ on the spur wheel $A^2$ in advance of the engagement of the splines $B^2$ by the dogs $D^4$. This results in the sliding member D being set in motion before its dogs $D^4$ are brought into contact with the splines $B^2$. As the shaft B is usually in motion during this gear-change, it follows that relative motion of the dogs $D^4$ and splines $B^2$ will be thus reduced, and the shock of their engagement will be lessened.

It will be seen that a relatively large number of teeth can be employed on the wheel $D^3$ constituting the dogs, so that they can readily engage the moving teeth $A^3$, and this without risk of grinding action on their ends because no resistance is offered to rotation by the member D other than its inertia and frictional contact with the shaft B. The known arrangement of the splines $B^2$ to form dogs alternately long and short, facilitates the engagement with them of the dogs $D^4$.

The present invention tends to lessen shock of engagement by making the final engagement take place at the shorter radius, that is at the splines $B^2$ whereby a change of gear can be effected with rapidity and ease.

The invention is applicable to a gear box provided with any usual number of change speeds and it will be seen that in conjunction with the known arrangement of alternately long and short splines to engage with the dogs on the sliding-member, direct driving engagement may be obtained with the same facility as for the other gear ratios in which gear wheels upon the lay shaft are engaged.

It will be seen that where a sliding member is carried upon the lay-shaft for meshing with coöperating gears on the driven shaft, the invention can be employed for engaging a gear or gears normally rotatably free upon the said lay-shaft. This provides a convenient arrangement for those types of gears which carry upon a lay-shaft a loose gear in constant mesh with a gear on the driving or driven shaft, and other gears on the lay-shaft are slidable for the purpose of selective engagement with gears on the said driving or driven shaft.

What I claim as my invention and desire to secure by Letters Patent is:—

1. In a change-speed gear, a driving shaft, a driven shaft coaxial with said driving shaft, a sliding member carried rotatably free upon one of said shafts, one set of dogs on the sliding member adapted to engage dogs on a coöperating member on the other shaft, and another set of dogs, also on the sliding member, to engage dogs on its own shaft, and an arrangement of the aforesaid dogs such that engagement of the coöperating member by the sliding member takes place in advance of the latter's engagement with its own shaft, substantially as described.

2. A change-speed gear as claimed in claim 1 in which the sliding member carries three sets of dogs, one set engaging the coöperating member, and the other two sets, (one at each end of the sliding member) engaging splines on its own shaft, substantially as and for the purpose described.

3. A change-speed gear as claimed in claim 1, in which the set of dogs engaging the coöperating member is constituted by a spur wheel concentrically mounted on the sliding member, which engages an internally and correspondingly toothed wheel on the said coöperating member, substantially as and for the purpose described.

In testimony whereof I have signed my name to this specification in the presence of two subscribing witnesses.

GEORGE ENOCH STANLEY.

Witnesses:
 WM. N. LINDLEY,
 HERBERT L. WILSON.